Jan. 4, 1949.    R. S. CARROLL    2,458,344
PRECISION DIAL INDICATOR MOUNTING
FOR MACHINE TOOLS
Filed May 22, 1948

INVENTOR
RICHARD S. CARROLL
BY
Chapin & Neal
ATTORNEYS

Patented Jan. 4, 1949

2,458,344

UNITED STATES PATENT OFFICE 2,458,344

PRECISION DIAL INDICATOR MOUNTING FOR MACHINE TOOLS

Richard S. Carroll, Longmeadow, Mass.

Application May 22, 1948, Serial No. 28,686

2 Claims. (Cl. 33—125)

This invention relates to a mounting for precision dial indicators for use on machine tools such as lathes and the like.

The principal object of the invention is to provide a dial indicator and mounting which in combination makes possible a quick change in the setting of the indicator for different depths or lengths of cut.

A further object is to provide a device of the above character in which the major units in which the cut is measured are accommodated by a precise movement of the indicator bodily in the direction of the cut while the minor units of measurement, or desired fractions of the major units, are indicated by the movement of the stem of the dial indicator.

Other and further objects residing in the details of the construction of the device will be made apparent in the following specification and claims.

In the accompanying drawing which discloses an illustrative embodiment of the invention, Fig. 1 is a fragmentary side elevational view of a lathe with the indicator and mounting in operative position;

Figure 1:
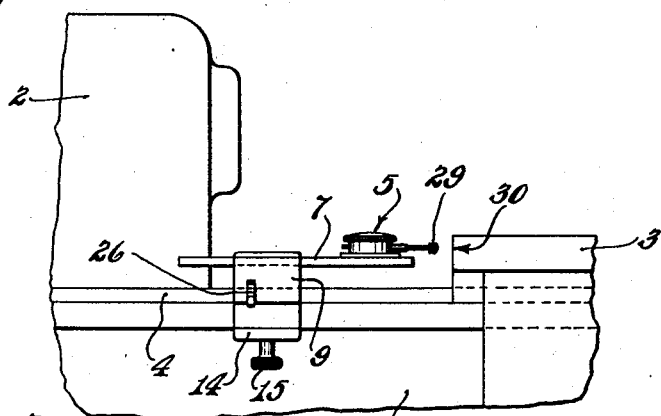
Figure 2:
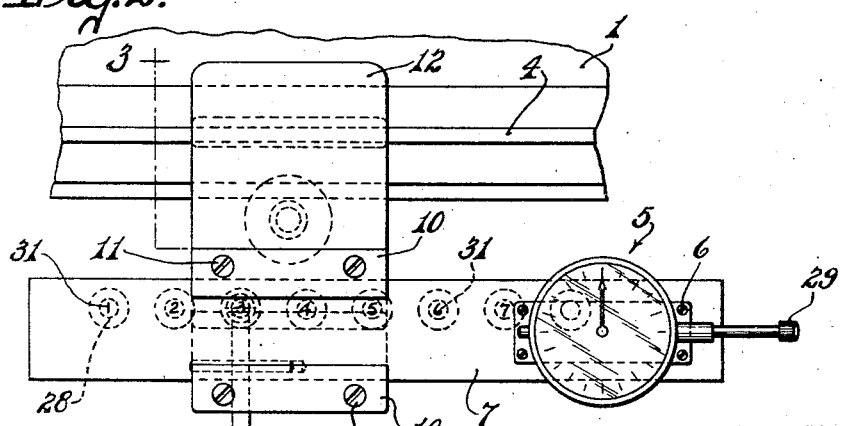
Fig. 2 is a plan view, on a larger scale, of the indicator and mounting shown in Fig. 1.
Figure 3:
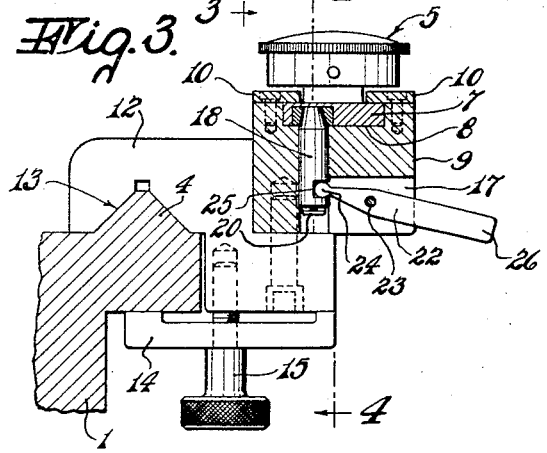
Fig. 3 is a sectional view substantially on line 3—3 of Fig. 2.
Figure 4:
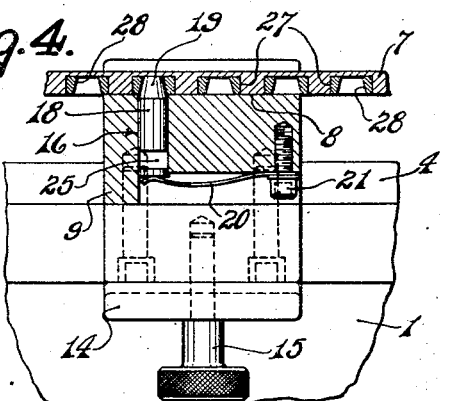
Fig. 4 is a sectional view substantially on line 4—4 of Fig. 3.

In Fig. 1 the bed of a lathe is shown at 1, the headstock being indicated at 2 and the tool carriage at 3. The bed is provided with the usual spaced ways, one of which is shown at 4, upon which the tool carriage is reciprocated in a conventional manner.

A dial indicator of conventional form and make, generally indicated at 5 is secured as by screws 6 to one end of a bar 7. The bar 7 is slidably mounted in a guide channel 8 formed in the upper surface of a block or supporting member 9. Plates 10 secured to the supporting member 9 by screws 11 extend inwardly over the edge portions of the bar, the channel 8 together with the plates 10 forming a guideway in which the bar 7 may be adjusted in the direction of travel of the carriage.

Secured to the supporting member 9 is the upper member 12 of a clamp, the lower surface of member 12 being formed with an angular groove 13 adapted to engage the upper face of the carriageway 4. The lower clamp member comprises a plate 14, connected to the upper clamp member by a screw 15 and engaging the lower face of the way 4. By tightening screw 15 the clamp may be rigidly secured to the way 4 to secure the supporting member in predetermined position with respect to the work piece supported by the headstock.

The supporting member 9 is formed with a bore 16, the upper end of which opens through the bottom of the guide channel 8. The lower end of bore 16 opens to a recess 17 formed in member 9. A pin 18 is slidably mounted in the bore, the pin being provided on its upper end with a frustro-conical head 19. The lower end of pin 18 is engaged by one end of a leaf spring 20 connected at the other end to the member 9 by a screw 21. The length of the pin 18 is such that the conical head normally projects into the guide channel 8. Means are provided for withdrawing the head 19 from the guide channel. As shown this means comprises a manually operable lever 22 pivoted at 23 to member 9, the inner end 24 engaging in a notch 25 formed in the lower end portion of the pin. The other end of lever 22 extends outwardly of recess 17 to form a handle 26 by which the lever may be operated to withdraw the head of the pin into the bore 16 against the action of spring 20.

The underside of bar 7 is provided with a plurality of spaced recesses 27 in which are mounted conical seats 28 in which the conical head 19 of pin 18 is adapted to be selectively engaged to releasably hold bar 7 in a selected position in guide channel 8.

The dial indicator 5 is secured to bar 7 with its operating stem 29 extending in the direction of the path of travel of the tool carriage and is engageable by a face 30 or other element of the carriage to indicate the subsequent advance of the carriage in the usual manner in terms of the fractional or minor units of measurement indicated on its dial. The centers of the conical seats 28 are spaced from each other distances representing major units of measurement to which the units of the dial bear fractional or other predetermined minor relationship.

In a given succession of cutting operations such as in cutting a stepped shaft, the bar 7 may be quickly released by the lever 26 and reset the number of major units of measurement in the next cut the fractional measurement being indicated on the dial by the rearward movement of the stem 29 of indicator 5.

While the device is illustrated in use on a lathe it will be understood that it can be applied to any cutting machine where it is desired to measure the operative advance of the tool or work.

The conical head 19 and the seats 28 may be formed and mounted in a precise manner to assure the desired degree of accuracy, the conical form of the mating surfaces bringing the bar to position even though the seat and pin are not in exact alignment as the pin initially enters the seat.

The upper surface of the bar 7 may be conveniently provided with indicia as at 31 indicative of the major measurement represented by the underlying seat 28.

What I claim is:

1. A dial indicator and mounting for use on a cutting machine having a traveling carriage which comprises a supporting member, a bar slidably mounted in said supporting member, a dial indicator fixed to one end of the bar with its actuating stem extending in the direction of the path of movement of the bar relative to the member, a plurality of recesses formed in the bar, the centers of said recesses being spaced from each other predetermined distances representing major units of measurement with respect to minor units of measurement indicated on the dial of the stem actuated indicator, a spring pressed pin mounted in said supporting member and selectively engageable in said recesses, manual means for retracting said pin, and means to clamp said supporting member to the bed of the cutting machine.

2. A dial indicator and mounting for use on a cutting machine having a traveling carriage which comprises, a supporting member, a bar slidably mounted in said supporting member, a dial indicator fixed to one end of the bar with its actuating stem extending in the direction of the path of movement of the bar relative to the member, a plurality of recesses formed in the bar, frustro-conical seats mounted in the recesses, the centers of said seats being spaced from each other predetermined distances representing major units of measurement for the cutting operation in relation to minor units of measurement indicated on the dial of the stem actuated indicator, a pin having a frustro-conical head reciprocably mounted in the supporting member, a spring engaging the end of the pin opposite the head and urging said head into engagement in a selected frustro-conical seat in the bar, manually operated means for withdrawing said pin from engagement with the seats, and means to releasably clamp said supporting member to the bed of the cutting machine.

RICHARD S. CARROLL.

No references cited.